(12) United States Patent
Noso et al.

(10) Patent No.: US 11,896,549 B2
(45) Date of Patent: Feb. 13, 2024

(54) SEAT DEVICE

(71) Applicant: AISIN CORPORATION, Aichi (JP)

(72) Inventors: Kazuo Noso, Toyoake (JP); Takashi Ogiso, Tajimi (JP); Hideaki Yamaguchi, Okazaki (JP)

(73) Assignee: AISIN CORPORATION, Kariya (JP)

( * ) Notice: Subject to any disclaimer, the term of this patent is extended or adjusted under 35 U.S.C. 154(b) by 388 days.

(21) Appl. No.: 16/492,799

(22) PCT Filed: Feb. 28, 2018

(86) PCT No.: PCT/JP2018/007470
§ 371 (c)(1),
(2) Date: Sep. 10, 2019

(87) PCT Pub. No.: WO2018/168463
PCT Pub. Date: Sep. 20, 2018

(65) Prior Publication Data
US 2020/0054518 A1 Feb. 20, 2020

(30) Foreign Application Priority Data
Mar. 13, 2017 (JP) .................. 2017-047154

(51) Int. Cl.
*A61H 9/00* (2006.01)
*A61H 23/02* (2006.01)
(Continued)

(52) U.S. Cl.
CPC ............ *A61H 9/0078* (2013.01); *A47C 7/72* (2013.01); *A61H 23/02* (2013.01); *B60N 2/976* (2018.02);
(Continued)

(58) Field of Classification Search
CPC ............... A61H 9/0078; A61H 23/02; A61H 2201/5007; A61H 2203/0431;
(Continued)

(56) References Cited

U.S. PATENT DOCUMENTS 6,087,942 A * 7/2000 Sleichter, III .......... G08B 21/06
340/576
6,212,719 B1 * 4/2001 Thomas ............... A47C 27/081
601/149

(Continued)

FOREIGN PATENT DOCUMENTS

JP 2000-262578 A 9/2000
JP 2006-198070 A 8/2006
(Continued)

OTHER PUBLICATIONS

International Search Report dated May 1, 2018 in PCT/JP2018/007470 filed on Feb. 28, 2018.

*Primary Examiner* — Timothy A Stanis
(74) *Attorney, Agent, or Firm* — Oblon, McClelland, Maier & Neustadt, L.L.P.

(57) ABSTRACT

A seat device includes a massage mechanism configured to massage a first muscle and a vibration generation mechanism configured to administer a vibratory stimulus having a frequency that causes muscle tone to a second muscle, the second muscle being an antagonist muscle of the first muscle.

3 Claims, 3 Drawing Sheets

(51) Int. Cl.
*B60N 2/00* (2006.01)
*A47C 7/00* (2006.01)
*B60N 2/90* (2018.01)
*A47C 7/72* (2006.01)

(52) U.S. Cl.
CPC ............... *A61H 2201/5007* (2013.01); *A61H 2203/0431* (2013.01); *A61H 2205/04* (2013.01); *A61H 2205/062* (2013.01); *A61H 2205/081* (2013.01)

(58) Field of Classification Search
CPC .......... A61H 2205/04; A61H 2205/062; A61H 2205/081; B60N 2/976; A47C 7/72
See application file for complete search history.

(56) References Cited

U.S. PATENT DOCUMENTS

| | | | |
|---|---|---|---|
| 2003/0028132 A1* | 2/2003 | Bastia | A61H 23/0254 |
| | | | 601/57 |
| 2006/0217644 A1 | 9/2006 | Ozaki et al. | |
| 2009/0099490 A1* | 4/2009 | Durt | B60N 2/986 |
| | | | 601/115 |
| 2012/0032478 A1* | 2/2012 | Friderich | B60N 2/976 |
| | | | 297/180.1 |

FOREIGN PATENT DOCUMENTS

| | | | |
|---|---|---|---|
| JP | 2011-67258 A | 4/2011 | |
| JP | 2013-85571 A | 5/2013 | |

\* cited by examiner

SEAT DEVICE

TECHNICAL FIELD

The present invention relates to a seat device having a function of massaging a seat occupant.

BACKGROUND

Conventionally, seat devices equipped with massage mechanisms have been known. Patent Document 1 discloses an example of a seat device including a pad configuring the entire seating surface of a seat, a massage mechanism arranged in the pad to press the back of a seat occupant by drawing in and discharging gas, and a vibration generation mechanism that transmits vibration to the massage mechanism.

PRIOR ART DOCUMENT

Patent Document

Patent Document 1: Japanese Laid-Open Patent Publication No. 2006-198070

SUMMARY OF THE INVENTION

Problems that the Invention is to Solve

In the above-described seat device, there is room for improvement in increasing a fatigue reduction effect of the seat occupant.

An objective of the present invention is to provide a seat device that improves a fatigue reduction effect.

Means for Solving the Problem

A seat device that solves the above-described problem includes a massage mechanism configured to massage a first muscle and a vibration generation mechanism configured to administer a vibratory stimulus having a frequency that causes muscle tone to a second muscle, the second muscle being an antagonist muscle of the first muscle.

MODES FOR CARRYING OUT THE INVENTION

A seat device applied to a driver's seat of a vehicle according to an embodiment will now be described with reference to the drawings.

Figure 1:
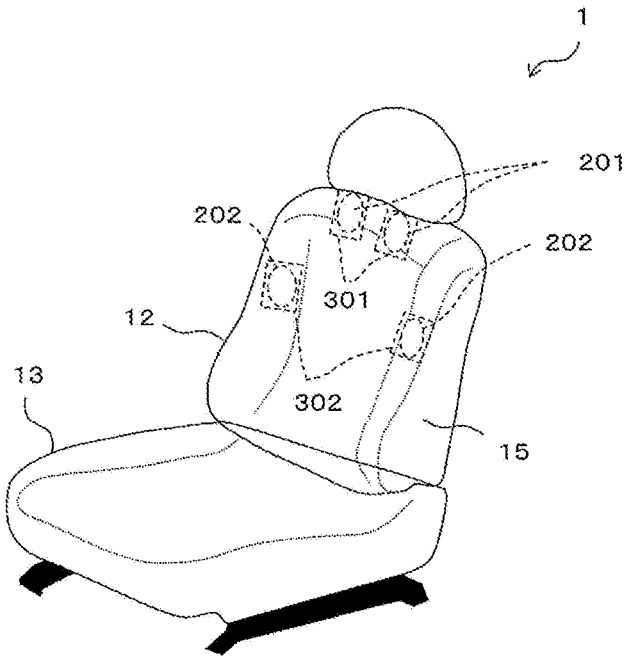
FIG. 1 is a perspective view showing a seat device according to an embodiment.
Figure 2:
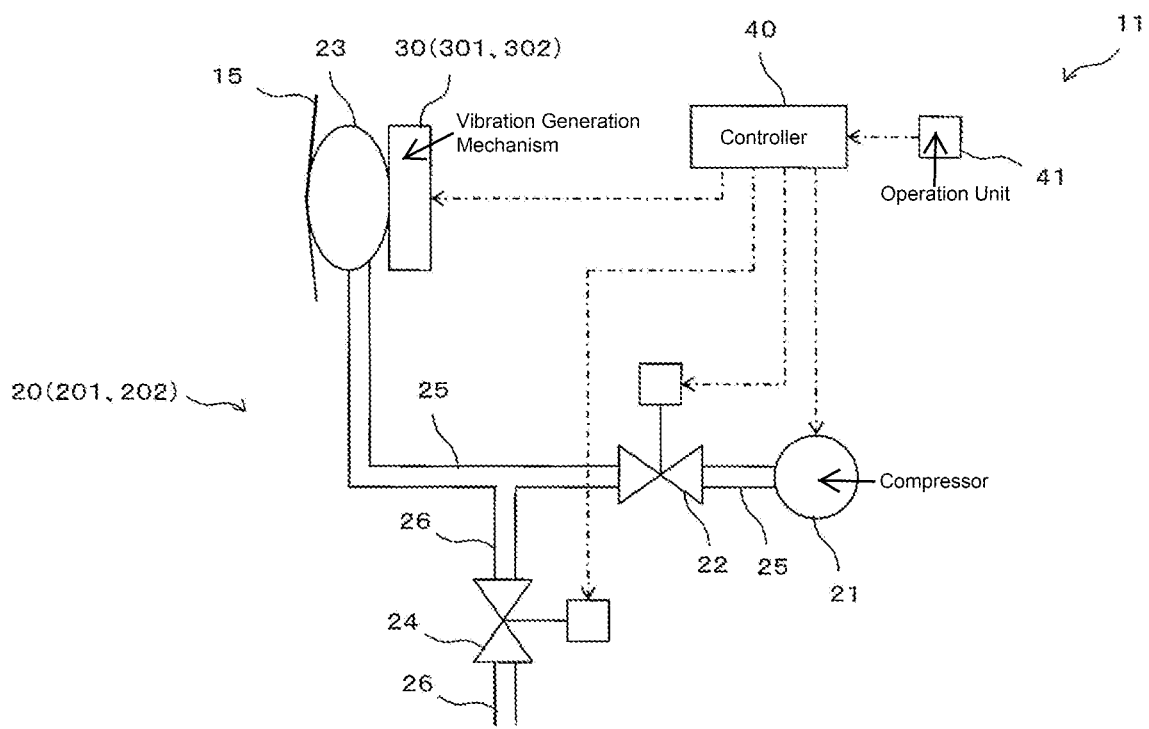
FIG. 2 is a diagram showing the massage mechanism of the seat device in FIG. 1.

As shown in FIGS. 1 and 2, a seat device 1 includes a seatback 12, which supports the back of a seat occupant, a seat cushion 13, which supports part of the buttocks and legs of the seat occupant, and a fatigue reduction device 11, which reduces fatigue of the seat occupant.

The seatback 12 and the seat cushion 13 are configured by, for example, covering a cushion material made of soft urethane with a cover 15. The seatback 12 is supported by the seat cushion 13 such that the seatback 12 can be inclined with respect to the seat cushion 13. The seat cushion 13 is secured to the floor of the passenger compartment.

As shown in FIG. 2, the fatigue reduction device 11 includes a massage mechanism 20, which is configured to massage a seat occupant, a vibration generation mechanism 30, which is configured to vibrate the seat occupant, and a controller 40, which is configured to actuate the massage mechanism 20 and the vibration generation mechanism 30.

As shown in FIG. 1, the massage mechanism 20 includes two first massage mechanisms 201, which massage the trapezius of the seat occupant, and two second massage mechanisms 202, which massage the latissimus dorsi of the seat occupant. The first massage mechanisms 201 and the second massage mechanisms 202 are arranged one by one on the left and right sides of the seatback 12 in correspondence with the left and right sides of the body of the seat occupant. That is, one set of the first massage mechanism 201 and the second massage mechanism 202 is arranged on each of the left and right sides of the seatback 12.

As shown in FIG. 2, the first massage mechanism 201 and the second massage mechanism 202 include an airbag 23, which expands when air flows into the airbag 23, a compressor 21, which supplies the airbag 23 with compressed air, a first passage 25, which connects the airbag 23 to the compressor 21, a second passage 26, which branches from the middle of the first passage 25, a first valve 22, which switches the flow of gas in the first passage 25, and a second valve 24, which switches the flow of gas in the second passage 26.

The airbag 23 is arranged in correspondence with each of the first and second massage mechanisms 201 and 202. The elements other than the airbag 23, namely, the compressor 21, the first passage 25, the second passage 26, the first valve 22, and the second valve 24, may be arranged in correspondence with each of the two first massage mechanisms 201 (or the two second massage mechanisms 202) or may be shared by the two first massage mechanisms 201 (or the two second massage mechanisms 202). The compressor 21 may be shared by all the first and second massage mechanisms 201 and 202.

The airbag 23 is made of an elastic material. The airbag 23 is arranged in contact with the cover 15. The airbag 23 expands when air is supplied and contracts when air is discharged. When the airbag 23 expands, the airbag 23 presses the cover 15 outward from the inside of the seatback 12.

The first passage 25 and the second passage 26 may be, for example, formed by an elastic tube or made of a material that does not elastically deform such as metal. The second passage 26 includes a first end, which is connected to the first passage 25, and a second end, which is located at the side opposite from the first passage 25 and opened to the atmosphere.

The first valve 22 and the second valve 24 are solenoid valves that are switched to an open state and a closed state when controlled electrically. The first valve 22 is arranged in the first passage 25 between the compressor 21 and the branch portion where the second passage 26 branches off. In the open state, the first valve 22 allows air to be supplied from the compressor 21 to the airbag 23. In the closed state, the first valve 22 restricts the supply of air from the compressor 21 to the airbag 23. In the open state, the second valve 24 allows air to leak from the airbag 23 into the atmosphere. In the closed state, the second valve 24 restricts the leakage of air from the airbag 23 into the atmosphere.

Thus, when the compressor 21 is driven with the first valve 22 open and the second valve 24 closed, air is supplied from the compressor 21 through the first passage 25 to the airbag 23. As a result, the airbag 23 expands toward the seat occupant. In this manner, the first and second massage mechanisms 201 and 202 press the back (back surface) of the seat occupant.

The air supplied from the compressor 21 to the airbag 23 is compressed. Thus, when the airbag 23 expands, the pressure of the airbag 23 is higher than the atmospheric pressure. Accordingly, when the first valve 22 is closed and the second valve 24 is open, the air in the airbag 23 is discharged through the second passage 26 into the atmosphere. As a result, the airbag 23 contracts. Thus, the first and second massage mechanisms 201 and 202 do not press the back of the seat occupant.

The airbags 23 of the first and second massage mechanisms 201 and 202 alternately repeat expansion and contraction in a cycle of less than 1 Hz. Further, when expanding, the airbags 23 of the first and second massage mechanisms 201 and 202 press the back of the seat occupant with a force of 15 to 20 kPa.

As shown in FIG. 1, the vibration generation mechanism 30 includes two first vibration generation mechanisms 301, which are configured to transmit vibration to the trapezius of the seat occupant, and two second vibration generation mechanisms 302, which are configured to transmit vibration to the latissimus dorsi of the seat occupant.

As shown in FIG. 2, each of the first and second vibration generation mechanisms 301 and 302 is attached to a corresponding one of the airbags 23 of the first and second massage mechanisms 201 and 202. It is preferred that the first and second vibration generation mechanisms 301 and 302 be attached to a surface of the airbag 23 located on the side opposite from a surface of the airbag 23 opposed to the cover 15. For example, the vibration generation mechanism 30 may be configured to generate vibration by driving a motor to which a weight eccentric to the output shaft is attached. Alternatively, the vibration generation mechanism 30 may be configured to generate vibration by cyclically supplying voltage to piezoelectric elements or solenoids. In addition, the vibration generation mechanism 30 can vibrate at a frequency that causes muscle tone in the muscles of a human body (for example, frequency of approximately 80 to 100 Hz).

The vibration generation mechanism 30 of the present embodiment vibrates the airbag 23, thereby vibrating the back of the seat occupant through the airbag 23 and the cover 15. When the vibration generation mechanism 30 is used to vibrate the back of the seat occupant, it is preferred that the airbag 23 be contracted such that the vibration does not attenuate.

As shown in FIG. 2, the controller 40 is connected to the massage mechanism 20 (more specifically, compressor 21, first valve 22, and second valve 24) and the vibration generation mechanism 30 electrically or via an onboard network such as a control area network (CAN).

The controller 40 is configured by a known microcomputer including a CPU, a RAM, a ROM, and the like. By using the CPU to execute the programs read from the ROM, the controller 40 controls the driving of the massage mechanism 20 and the vibration generation mechanism 30. When receiving a signal from an operation unit 41 (manual operation unit) including one or more switches connected to the controller 40, the controller 40 simply needs to start controlling the massage mechanism 20 and the vibration generation mechanism 30.

Opposing actions between the muscles will now be described with reference to FIG. 3.

Figure 3:
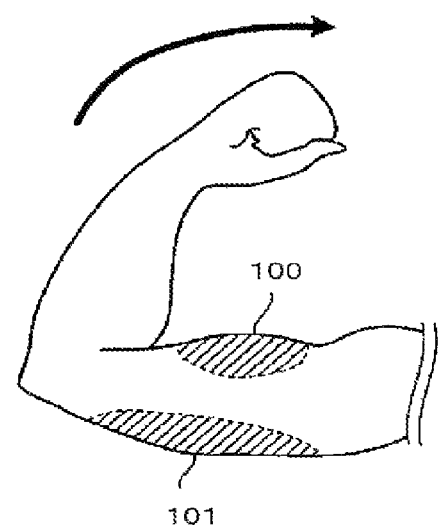
FIG. 3 is a diagram showing a state in which the arm of a human body is bent.

As shown in FIG. 3, when the elbow joint is bent, a biceps 100 becomes tense (contracts) and the tension of a triceps 101 is relieved. When the elbow joint is stretched, the tension of the biceps 100 is relieved and the triceps 101 becomes tense. In the following description, in a pair of muscles that move oppositely during a certain action such as the biceps 100 and the triceps 101 of the elbow joint, one of the muscles is referred to as the antagonist muscle of the other muscle.

In the present embodiment, the trapezius (first muscle) is the antagonist muscle of the latissimus dorsi (second muscle), and the latissimus dorsi (second muscle) is the antagonist muscle of the trapezius (first muscle). Thus, the seat device 1 of the present embodiment includes the first massage mechanism 201, which massages the trapezius, the second vibration generation mechanism 302, which vibrates to make the antagonist muscle of the trapezius (i.e., latissimus dorsi) tense, the second massage mechanism 202, which massages the latissimus dorsi, and the first vibration generation mechanism 301, which vibrates to make the antagonist muscle of the latissimus dorsi (i.e., latissimus dorsi) tense.

The processes executed by the controller 40 will now be described with reference to the flowchart in FIG. 4.

In step S1, the controller 40 determines whether a control start condition is satisfied. For example, the control start condition is that a start switch arranged on the operation unit 41 is operated by the seat occupant, more specifically, a signal that has been transmitted is received by operating the start switch. When the control start condition is satisfied (step S1: YES), the controller 40 proceeds to step S2. When the control start condition is not satisfied (step S1: NO), the controller 40 ends the current process.

In step S2, the controller 40 actuates the first massage mechanism 201 and the second vibration generation mechanism 302 together and stops the second massage mechanism 202 and the first vibration generation mechanism 301. More specifically, in step S2, the controller 40 causes the first massage mechanism 201 to massage the trapezius of the seat occupant and causes the second vibration generation mechanism 302 to vibrate the latissimus dorsi of the seat occupant. Further, in step S2, the controller 40 restricts the driving of the second massage mechanism 202 to prevent the second massage mechanism 202 from massaging the latissimus dorsi of the seat occupant and restricts the driving of the first vibration generation mechanism 301 to prevent the first vibration generation mechanism 301 from vibrating the trapezius of the seat occupant.

That is, the controller 40 switches the second valve 24 of the first massage mechanism 201 to the closed state and switches the first valve 22 of the first massage mechanism 201 to the open state. Subsequently, the controller 40 drives the compressor 21 of the first massage mechanism 201. In this manner, the airbag 23 of the first massage mechanism 201 is supplied with compressed air, thereby expanding the airbag 23. Then, the controller 40 stops the driving of the compressor 21 of the first massage mechanism 201. Afterwards, the controller 40 switches the second valve 24 of the first massage mechanism 201 to the open state. In this manner, air is discharged from the airbag 23 of the first massage mechanism 201, thereby contracting the airbag 23. Thus, the controller 40 causes the first massage mechanism 201 to massage the trapezius of the seat occupant by expanding and contracting the airbag 23 of the first massage mechanism 201 in a predetermined cycle.

Additionally, the controller 40 drives the second vibration generation mechanism 302. In this manner, the controller 40 causes the second vibration generation mechanism 302 to administer a vibratory stimulus having a frequency that causes muscle tone to the latissimus dorsi of the seat occupant.

The controller 40 does not drive the second massage mechanism 202 and the first vibration generation mechanism 301.

After the time elapsed from when the process of step S2 was started becomes a determination time or longer, the controller 40 ends the process of step S2 and starts the process of the next step S3. The determination time may refer to a predetermined fixed value or a variable value that can be changed by the seat occupant. When the determination time is a fixed value, the fixed value simply needs to be, for example, several seconds to several tens of seconds.

In step S3, substantially in the same manner as step S2, the controller 40 actuates the second massage mechanism 202 and the first vibration generation mechanism 301 together and stops the first massage mechanism 201 and the second vibration generation mechanism 302. More specifically, in step S3, the controller 40 causes the second massage mechanism 202 to massage the latissimus dorsi of the seat occupant and causes the first vibration generation mechanism 301 to vibrate the trapezius of the seat occupant. Further, in step S3, the controller 40 restricts the driving of the first massage mechanism 201 to prevent the first massage mechanism 201 from massaging the trapezius of the seat occupant and restricts the driving of the second vibration generation mechanism 302 to prevent the second vibration generation mechanism 302 from vibrating the latissimus dorsi of the seat occupant. That is, the controller 40 switches between a state in which the first massage mechanism 201 and the second vibration generation mechanism 302 are actuated and a state in which the second massage mechanism 202 and the first vibration generation mechanism 301 are actuated.

After the time elapsed from when the process of step S3 was started becomes the determination time or longer, the controller 40 ends the process of step S3 and starts the process of the next step S4.

In step S4, the controller 40 determines whether a control end condition is satisfied. For example, the control end condition is that an end switch arranged on the operation unit 41 is operated by the seat occupant, more specifically, a signal that has been transmitted is received by operating the end switch. When the control end condition is satisfied (step S4: YES), the controller 40 proceeds to step S5. When the control end condition is not satisfied (step S4: NO), the controller 40 advances the process to step S2. That is, in this case (step S4: NO), in order to reduce fatigue of the seat occupant, the controller 40 intermittently drives the first massage mechanism 201, the second massage mechanism 202, the first vibration generation mechanism 301, and the second vibration generation mechanism 302. In other words, the state in which the first massage mechanism 201 and the second vibration generation mechanism 302 are actuated and the state in which the second massage mechanism 202 and the first vibration generation mechanism 301 are alternately repeated.

In step S5, the controller 40 stops the driving of the second massage mechanism 202 and the first vibration generation mechanism 301 and ends the current process.

The operation of the seat device 1 will now be described.

The seat device 1 receives a signal from the operation unit 41, which is operated by the seat occupant (driver), to start movement to reduce fatigue of the seat occupant. That is, the first massage mechanism 201 massages the trapezius of the seat occupant, and the second vibration generation mechanism 302 transmits vibration causing muscle tone to the latissimus dorsi of the seat occupant at the same time. In this manner, the trapezius, which is the antagonist muscle of the latissimus dorsi, is massaged with the muscle tone of the trapezius relieved. When the determination time elapses, the second massage mechanism 202 massages the latissimus dorsi of the seat occupant, and the first vibration generation mechanism 301 transmits vibration causing muscle tone to the trapezius of the seat occupant at the same time. In this manner, the latissimus dorsi, which is the antagonist muscle of the trapezius, is massaged with the muscle tone of the latissimus dorsi relieved.

The above-described embodiment has the following advantages.

(1) When the second vibration generation mechanism 302 administers a vibratory stimulus having a frequency that causes muscle tone to the latissimus dorsi, muscle tone occurs in the latissimus dorsi. Further, muscle tone of the trapezius, which is the antagonist muscle of the latissimus dorsi, can be relieved. In addition, the first massage mechanism 201 massages the trapezius of which the muscle tone has been reduced to effectively relieve the muscle tone of the trapezius. Thus, the seat device 1 improves the fatigue reduction effect of the seat occupant.

(2) When the first vibration generation mechanism 301 administers a vibratory stimulus having a frequency that causes muscle tone to the trapezius, muscle tone occurs in the trapezius. Further, muscle tone of the latissimus dorsi, which is the antagonist muscle of the trapezius, can be relieved. In addition, the second massage mechanism 202 massages the latissimus dorsi of which the muscle tone has been reduced to effectively relieve the muscle tone of the latissimus dorsi. This not only relieves the muscle tone of the trapezius but also relieves the muscle tone of the latissimus dorsi. This relieves the muscle tone of the trapezius and thus prevents the muscle tone of the latissimus dorsi from increasing.

(3) The controller 40 automatically and alternately switches between the state in which the first massage mechanism 201 and the second vibration generation mechanism 302 are actuated and the state in which the second massage mechanism 202 and the first vibration generation mechanism 301 are actuated. This effectively relieves the muscle tone of both the trapezius and the latissimus dorsi.

(4) The driver who drives the vehicle tends to cause muscle tone in the trapezius and the latissimus dorsi when performing a steering operation. When the seat device 1 is applied to the driver's seat of the vehicle, the fatigue reduction effect of the seat occupant can be obtained.

Modifications of the above-described embodiment will now be described.

The muscles corresponding to the positions where the massage mechanism 20 and the vibration generation mechanism 30 are arranged do not have to be trapezius and latissimus dorsi. For example, the seat cushion 13 may be extended downward to arrange a part located downward from the knee of the seat occupant and provide the fatigue reduction device 11 at the part. This improves the fatigue reduction effect of the muscle of the part located downward from the knee and its antagonist muscle.

The controller 40 does not have to be provided. For example, the operation unit 41 may be electrically connected to the massage mechanism 20 and the vibration generation mechanism 30 such that the massage mechanism 20 and the vibration generation mechanism 30 are actuated and stopped in accordance with signals from the operation unit 41. In this case, a switch (manual switch) may be provided to alternately switch between the state in which the first massage mechanism 201 and the second vibration Generation mechanism 302 are actuated and the state in which the second massage mechanism 202 and the first vibration generation mechanism 301 are actuated.

Figure 4:
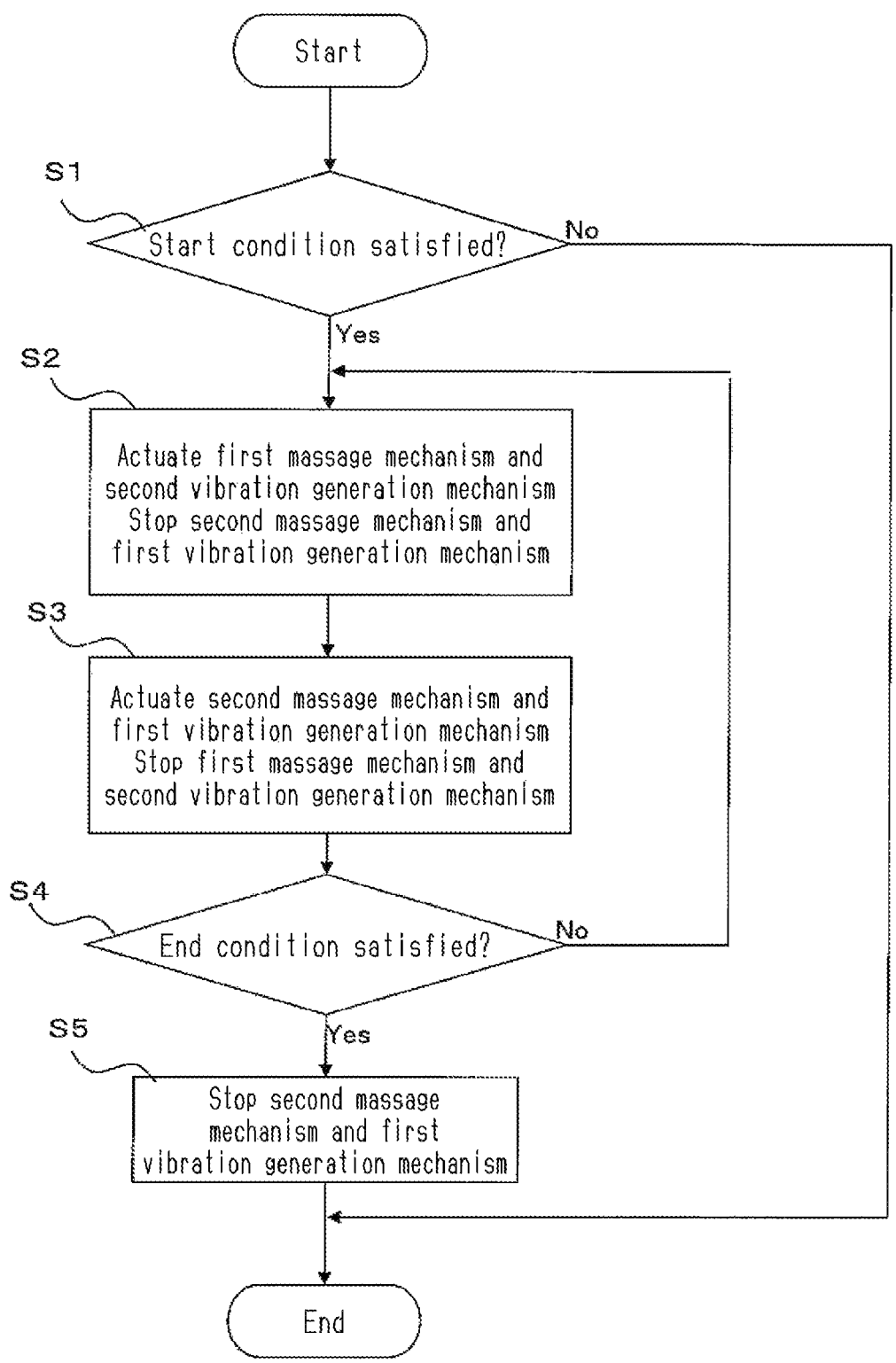
FIG. 4 is a flowchart illustrating the processes performed by the controller of the seat device shown in FIG. 1.

In the flowchart shown in FIG. 4, whether the control start condition is satisfied does not have to be determined based on an operation of the start switch on the operation unit 41. For example, the determination may be made in accordance with whether the traveling distance of the vehicle reaches a predetermined distance or longer, in accordance with whether the driving time of the vehicle reaches a predetermined time or longer, or based on the operation history of steering.

In the flowchart shown in FIG. 4, whether the control end condition is satisfied does not have to be determined based on an operation of the end switch on the operation unit 41. For example, the determination may be made based on the time elapsed from when the control start condition is satisfied.

The vibration generation mechanism 30 may be arranged in contact with the back of the seat occupant without using the massage mechanism 20. In this case, as long as the seat device 1 includes the first massage mechanism 201 and the second vibration generation mechanism 302, the seat device 1 does not have to include the second massage mechanism 202 and the first vibration generation mechanism 301. Alternatively, as long as the seat device 1 includes the second massage mechanism 202 and the first vibration generation mechanism 301, the seat device 1 does not have to include the first massage mechanism 201 and the second vibration generation mechanism 302.

The seat device 1 does not have to be used for a vehicle. For example, the seat device 1 may be used for an airplane seat or a home-use seat.

The controller 40 is not limited to one that performs software processing on all processes executed by itself. For example, the controller 40 may include a dedicated hardware circuit (for example, application specific integrated circuit: ASIC) that executes hardware processing on at least part of the processes executed by itself. That is, the controller 40 may be circuitry including: 1) one or more processors that operate according to a computer program (software); 2) one or more dedicated hardware circuits that execute at least part of various processes, or 3) a combination thereof. The processor includes a CPU and memories such as a RAM and a ROM. The memories store program codes or commands configured to cause the CPU to execute processes. The memories, or computer readable media, include any type of media that are accessible by general-purpose computers and dedicated computers.

What is claimed is:

1. A seat device comprising:
   a first massage mechanism configured to massage a first muscle, the first massage mechanism including a first airbag;
   a first vibration generation mechanism attached to a surface of the first airbag, the first vibration generation mechanism is configured to administer a vibratory stimulus to the first airbag, the vibratory stimulus having a frequency that causes muscle tone to the first muscle;
   a second massage mechanism configured to massage a second muscle, the second massage mechanism including a second airbag;
   a second vibration generation mechanism attached to a surface of the second airbag, the second vibration generation mechanism is configured to administer a vibratory stimulus to the second airbag, the vibratory stimulus having a frequency that causes muscle tone to a second muscle, the second muscle being an antagonist muscle of the first muscle; and
   a controller programmed to switch between a state in which the first massage mechanism and the second vibration generation mechanism are actuated together and the first vibration generation mechanism and the second massage mechanism are stopped, the second airbag of the second massage mechanism being contracted when the second vibration generation mechanism is active so that the vibration does not attenuate, and a state in which the second massage mechanism and the first vibration generation mechanism are actuated together and the first massage mechanism and the second vibration generation mechanism are stopped, the first airbag of the first massage mechanism being contracted when the first vibration generation mechanism is activated so that the vibration does not attenuate.

2. The seat device according to claim 1, further comprising a manual operation unit configured to switch between a state in which the first massage mechanism and the second vibration generation mechanism are actuated together and a state in which the second massage mechanism and the first vibration generation mechanism are actuated together.

3. The seat device according to claim 1, wherein one of the first muscle and the second muscle is a trapezius, and the other one of the first muscle and the second muscle is a latissimus dorsi.

* * * * *